(12) United States Patent
Chaliparambil et al.

(10) Patent No.: US 9,578,091 B2
(45) Date of Patent: Feb. 21, 2017

(54) SEAMLESS CLUSTER SERVICING

(71) Applicant: Microsoft Technology Licensing, LLC, Redmond, WA (US)

(72) Inventors: Kishore Chaliparambil, Snoqualmie, WA (US); Carlo Curino, San Jose, CA (US); Kannababu Karanam, Sammamish, WA (US); Subramaniam Venkatraman Krishnan, Redmond, WA (US); Christopher William Douglas, Moutain View, CA (US); Sriram Rao, San Jose, CA (US); Mostafa Elhemali, Seattle, WA (US); Chuan Liu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 14/143,797

(22) Filed: Dec. 30, 2013

(65) Prior Publication Data

US 2015/0188989 A1    Jul. 2, 2015

(51) Int. Cl.
*H04L 29/08* (2006.01)
*H04L 29/06* (2006.01)
(Continued)

(52) U.S. Cl.
CPC ............. *H04L 67/10* (2013.01); *G06F 9/4856* (2013.01); *H04L 41/00* (2013.01); *H04L 67/34* (2013.01)

(58) Field of Classification Search
CPC ................................ G06F 9/5088; H04L 67/34
See application file for complete search history.

(56) References Cited

U.S. PATENT DOCUMENTS 7,840,969 B2    11/2010   Comer
8,296,271 B1    10/2012   Richardson et al.
(Continued)

FOREIGN PATENT DOCUMENTS

WO    2013163237 A1    10/2013

OTHER PUBLICATIONS

IBM: "Method and Apparatus for relocating IT Services across different Hardware and Software platforms", Feb. 2010.*
(Continued)

*Primary Examiner* — Azizul Choudhury
(74) *Attorney, Agent, or Firm* — Nicholas Chen; Kate Drakos; Micky Minhas

(57) ABSTRACT

Embodiments are directed to progressively migrating source computer nodes where the source computer nodes perform a computer-implemented service. In one embodiment, a computer system determines that execution of the performed service is to be migrated from the source computer nodes to target computer nodes. The computer system groups the source computer nodes into multiple source subgroups, where each source subgroup includes at least one source computer node. The computer system then schedules creation of target subgroups of target nodes. These target subgroups include at least one source computer node and, themselves, correspond to a source subgroup. The computer system activates a first target subgroup corresponding to a first source subgroup, and deactivates the first source subgroup. In this manner, the first target subgroup replaces the first source subgroup. Still further, the target subgroups are scheduled to be created only after the first source subgroup has been deactivated.

21 Claims, 3 Drawing Sheets

(51) Int. Cl.
*H04L 12/24* (2006.01)
*G06F 9/48* (2006.01)

(56) References Cited

U.S. PATENT DOCUMENTS

| | | | |
|---|---|---|---|
| 8,332,497 | B1 | 12/2012 | Gladish et al. |
| 8,484,163 | B1 | 7/2013 | Yucel et al. |
| 2002/0135611 | A1* | 9/2002 | Deosaran .................. G06F 9/54 715/738 |
| 2002/0156884 | A1 | 10/2002 | Bertram et al. |
| 2002/0165864 | A1 | 11/2002 | Azagury et al. |
| 2002/0194248 | A1* | 12/2002 | Wood .................... G06F 9/5038 718/102 |
| 2004/0205767 | A1 | 10/2004 | Partanen |
| 2005/0091354 | A1* | 4/2005 | Lowell .................. G06F 9/4856 709/223 |
| 2005/0119965 | A1* | 6/2005 | Kathwari ............... G06Q 40/06 705/37 |
| 2005/0198238 | A1 | 9/2005 | Sim et al. |
| 2005/0256948 | A1 | 11/2005 | Hu |
| 2006/0053216 | A1 | 3/2006 | Deokar et al. |
| 2007/0083868 | A1* | 4/2007 | Sankaranarayan ... G06F 9/5038 718/104 |
| 2007/0150572 | A1 | 6/2007 | Cox et al. |
| 2007/0256081 | A1 | 11/2007 | Comer |
| 2009/0037902 | A1 | 2/2009 | Gebhart et al. |
| 2009/0109849 | A1* | 4/2009 | Wood ...................... H04L 47/10 370/235 |
| 2009/0113034 | A1 | 4/2009 | Krishnappa et al. |
| 2009/0300423 | A1 | 12/2009 | Ferris |
| 2009/0313635 | A1 | 12/2009 | Dasdan |
| 2009/0320023 | A1* | 12/2009 | Barsness ............... G06F 9/5088 718/100 |
| 2010/0058318 | A1* | 3/2010 | Bernabeu-Auban ...... G06F 8/65 717/172 |
| 2010/0122065 | A1 | 5/2010 | Dean et al. |
| 2010/0223618 | A1 | 9/2010 | Fu et al. |
| 2011/0010691 | A1 | 1/2011 | Lu et al. |
| 2011/0271278 | A1 | 11/2011 | Dittrich |
| 2011/0321031 | A1* | 12/2011 | Dournov ............. G06F 9/45533 717/171 |
| 2012/0005522 | A1 | 1/2012 | Kaminski |
| 2012/0066541 | A1* | 3/2012 | Dournov ............. G06F 11/0709 714/3 |
| 2012/0226788 | A1 | 9/2012 | Jackson |
| 2012/0317447 | A1 | 12/2012 | Yildiz et al. |
| 2013/0024037 | A1 | 1/2013 | Jin et al. |
| 2013/0028106 | A1 | 1/2013 | Frost |
| 2013/0159344 | A1 | 6/2013 | Cahill et al. |
| 2013/0191436 | A1 | 7/2013 | Chintalapati et al. |

OTHER PUBLICATIONS

Honggen, Li, "Building Multi-Tenant SaaS Applications on Windows Azure", In Symbio White Paper, Sep. 9, 2013, 9 pages.
"Patterns Windows Azure In-Place Upgrades", Published on: Nov. 28, 2009, Available at: http://www.kefalidis.me/2009/11/patterns-windows-azure-in-place-upgrades/.
"Performing a Rolling Upgrade on your Cluster", Retrieved on: Nov. 19, 2013, Available at: http://www.cloudera.com/content/cloudera-content/cloudera-docs/CM4Ent/4.6.1/Cloudera-Manager-Managing-Clusters/cmmc_rolling_upgrade.html.
"Update a Windows Azure Service", Published on: Aug. 20, 2013, Available at: http://msdn.microsoft.com/en-us/library/windowsazure/hh472157.aspx.
Yang, et al., "A Hybrid Approach to Placement of Tenants for Service-based Multi-Tenant SaaS Application", In IEEE Asia-Pacific Services Computing Conference, Dec. 12, 2011, 7 pages.
Jacobs, et al., "Ruminations on Multi-Tenant Databases", In 12th GI-Conference on Database Systems in Business, Technology and Web, Mar. 2007, 5 pages.
Hanawa, et al., "Large-Scale Software Testing Environment Using Cloud Computing Technology for Dependable Parallel and Distributed Systems", In Proceedings of Third International Conference on Software Testing, Verification, and Validation Workshops, Apr. 6-10, 2010, pp. 428-433.
Joseph, Joshy, "Patterns for High Availability, Scalability, and Computing Power with Windows Azure", Published on: May 2009. Available at <<http://msdn.microsoft.com/en-us/magazine/dd727504.aspx>>.
"An Introduction to cloud testing", Available at least as early as Nov. 2011. Available at <<http://www.businesscloudnews.com/applications/622-guest-post-an-introduction-to-cloud-testing.html>>.
"LISA is the Essential Platform for Truly Elastic, Effective Pre-production Cloud Environemnts", Available at least as early as Nov. 2011. Available at <<http://www.itko.com/solutions/cloud.jsp>>.
"Atos Origin Launches Cloud IT Testing Service", Available at least as early as Nov. 2011. Available at <<http://www.cloudpro.co.uk/saas/it-and-application-management/1023/atos-origin-launches-cloud-it-testing-service>>.
U.S. Appl. No. 13/356,366, filed Apr. 29, 2013, Office Action.
U.S. Appl. No. 13/356,366, filed Nov. 7, 2013, Office Action.
U.S. Appl. No. 13/356,366, filed May 8, 2014, Office Action.
U.S. Appl. No. 13/356,366, filed Sep. 26, 2014, Notice of Allowance.

* cited by examiner

SEAMLESS CLUSTER SERVICING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems.

Computer databases have long been used to store and provide access to data. Computer databases allow users to enter queries and receive results that are intended to satisfy the query. Various types of queries may be entered, and the type of query may depend on which type of database is being used. For instance, relational databases may allow users to enter certain types of queries and receive the corresponding results.

BRIEF SUMMARY

Embodiments described herein are directed to progressively migrating source computer nodes where the source computer nodes perform a computer-implemented service. In one embodiment, a computer system determines that execution of the performed service is to be migrated from the source computer nodes to target computer nodes. The computer system groups the source computer nodes into multiple source subgroups, where each source subgroup includes at least one source computer node. The computer system then schedules creation of target subgroups of target nodes. These target subgroups include at least one source computer node and, themselves, correspond to a source subgroup. The computer system activates a first target subgroup corresponding to a first source subgroup, and deactivates the first source subgroup. In this manner, the first target subgroup replaces the first source subgroup. Still further, the target subgroups are scheduled to be created only after the first source subgroup has been deactivated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additionally, it should be noted that features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to progressively migrating source computer nodes where the source computer nodes perform a computer-implemented service. In one embodiment, a computer system determines that execution of the performed service is to be migrated from the source computer nodes to target computer nodes. The computer system groups the source computer nodes into multiple source subgroups, where each source subgroup includes at least one source computer node. The computer system then schedules creation of target subgroups of target nodes. These target subgroups include at least one source computer node and, themselves, correspond to a source subgroup. The computer system activates a first target subgroup corresponding to a first source subgroup, and deactivates the first source subgroup. In this manner, the first target subgroup replaces the first source subgroup. Still further, the target subgroups are scheduled to be created only after the first source subgroup has been deactivated.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
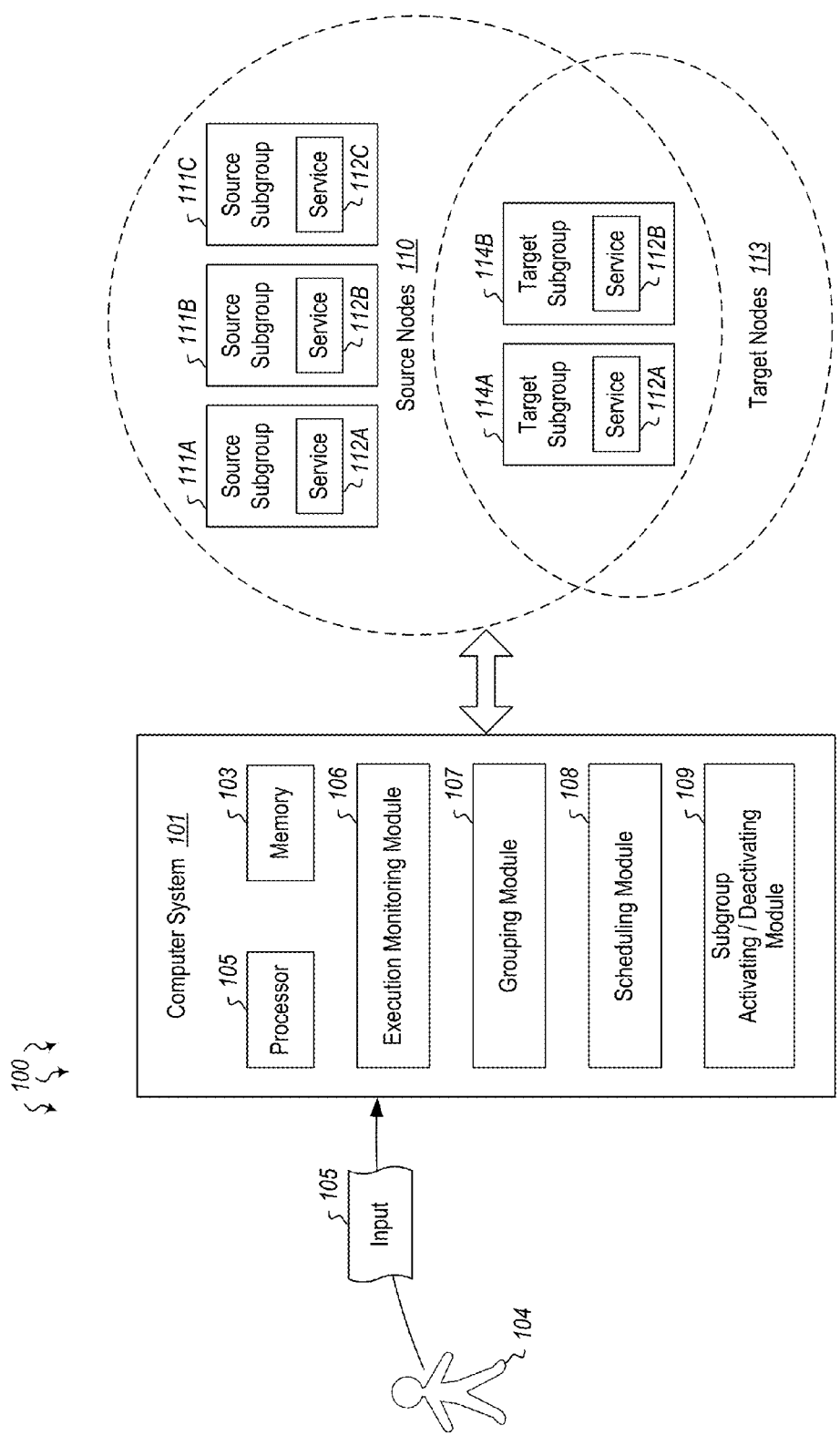
FIG. 1 illustrates a computer architecture in which embodiments described herein may operate including progressively migrating source computer nodes.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has traditionally been volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the execution monitoring module 106 may monitor execution of jobs or services on various computer nodes. For example, the execution monitoring module 106 may monitor the execution of service 112A in source subgroup 111A. The source subgroup may be a group of source nodes 110 or other computing resources. Each source subgroup may include one or more of the source computer nodes 110. The source nodes 110 may be physical or virtual nodes and may allow the distributed processing of multiple different jobs or services.

In some cases, a job or service being processed in a subgroup (e.g. service 112B in source subgroup 111B or service 112C in subgroup 111C) may need to be moved to a different node. For instance, in cases where software running on the source node is to be upgraded, the node will need to be deactivated and restarted with the new, updated software. As such, processing of the service or job will need to be completed or transferred to other nodes (e.g. one of target nodes 113). The grouping module 107 may be responsible for creating subgroups within the source nodes (and within the target nodes 113), and may further assign services to subgroups. Once assigned, the jobs or services are processed by the assigned source subgroup until completion or until execution is migrated to another subgroup. It should be noted that each subgroup may have substantially any number of nodes, and that the number of nodes may change dynamically as processing needs change. For example, if a user or tenant submits a large job, and that job is assigned to a subgroup, additional resources may be assigned to that subgroup to help process the job.

As used herein, a group of nodes may be referred to as a cluster. Accordingly, the group of source nodes 110 may be a cluster, and the group of target nodes may be another cluster. It should be noted that these groups or clusters may be physical and/or logical. These clusters may have different attributes or characteristics. For instance, some clusters may be stateful, and some may be stateless. Stateless clusters do not store state information on the cluster nodes, while stateful clusters do. Performing upgrades or migrations on stateful may involve different steps or introduce different limitations than performing upgrades or migrations on stateless clusters. Similarly, performing upgrades may be different when the upgrade is a "breaking" or a "non-breaking" upgrade. "Breaking" upgrades have one or more components that are incompatible with the older version of the software, while "non-breaking" upgrades are backwards compatible with the older software version. In the past, some upgrades would work for stateful clusters, but not stateless clusters, or would work for non-breaking upgrades but not for breaking upgrades. Embodiments described herein allow migrating or upgrading software (whether breaking or non-breaking) on stateful and stateless clusters.

As mentioned above, a group or cluster of source nodes (e.g. 110) may allow multiple different users or tenants to submit jobs or services that are to be processed. The cluster may be created or instantiated with different subgroups or roles, each of which is assigned one or more source nodes to process one or more assigned jobs or services. Various roles may be included in each cluster, including gateway and server roles that perform networking and managing functions. Other roles may include worker roles which are assigned to process jobs submitted by tenants.

During a software upgrade from an older software version to a newer software version, the worker roles may be upgraded one role (i.e. subgroup) at a time. A target cluster 113 is first provisioned with one or more roles including potentially server roles and gateway roles. These roles are running the upgraded software version. The worker roles are then deleted and recreated one by one in the new target cluster. The worker roles are deactivated one at a time, while the other worker roles remain running. As such, the number of cores required during the upgrade process is much less than performing an upgrade to all worker roles at once (which would require a separate node for each role, or two times the number of nodes currently being used). By implementing the embodiments described herein, all of the jobs in the old worker role may be drained before moving the role to the new target cluster.

Figure 3:
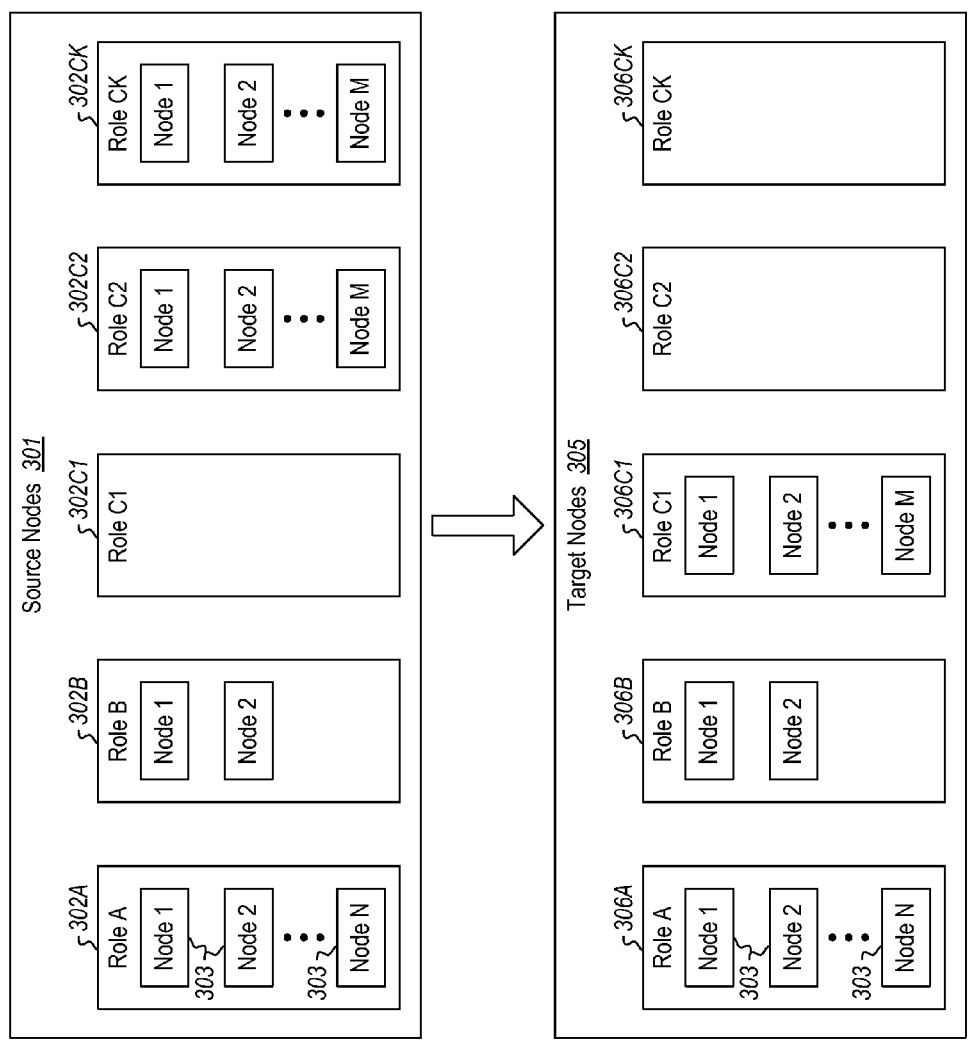
FIG. 3 illustrates an embodiment in which a role is migrated from a source subgroup to a target subgroup.

As shown in FIG. 3, there may be multiple (K) identical worker roles (302C1, 302C2, 302CK), each running the same version of software (on nodes 303). The scheduling module 108 of FIG. 1 may be used to coordinate the operations during the upgrade process. It may implement a service to query the cluster configuration, determine job details and to read/write state information. The service may also be used to delete and create virtual machine (VM) instances in each worker role.

In one embodiment, a sequence of operations for upgrading roles using a new cluster may flow as follows: 1) A cluster operator may build the new deployment package with the required changes and initiate the upgrade. 2) An upgrade service may access the cluster to determine the cluster configuration and obtain a list of available worker roles and their current state in the system. 3) The upgrade service then creates a new target cluster. The target cluster (e.g. 113) may be initiated with one or more roles including a gateway role, a server role or other roles.

4) The upgrade service will select a worker role with the least amount of load (e.g. source subgroup 111A) and inform the scheduler (e.g. 108) that it is planning to upgrade the worker role. This will put the old cluster (i.e. source nodes 110) in an upgrading state. After this point (at least in some embodiments), the scheduler will not schedule any new jobs to the old cluster. 5) The scheduler will note that source subgroup 111A (i.e. the worker role) is being upgraded. The scheduler will not launch any new containers on the nodes in source subgroup 111A. 6) The scheduler will wait for all the jobs/services running on subgroup 111A to be completed or until timeout is elapsed. In some cases, such as when security patches are to be applied, the scheduler will kill all the jobs and perform an upgrade as soon as possible. 7) The scheduler indicates that it is ready to upgrade source subgroup 111A.

8) The scheduler then deletes the VM instances in the source subgroup 111A in the old cluster, thereby releasing the source nodes/cores available on the source subgroup. The scheduler will keep track of the jobs that fail during this process. 9) After source subgroup 111A is deactivated/deleted, the scheduler will deploy the updated target subgroup (e.g. 114A) on the target nodes 113. As shown in FIG. 3, roles A and B (302A and 302B, respectively) are migrated from the source nodes 301 to the target nodes 305, and are running the updated software. Role C1 (e.g. a worker role) has been migrated to target subgroup 306C1, while roles C2 (302C2) and CK (302CK) remain running in the source nodes 301. While logical subgroups may be created in the target nodes 305 for roles C2 (306C2) and CK (306CK), no target or source nodes or services have been assigned to those roles. Nodes and services will be assigned once the corresponding subgroups 302C2 and 302CK have been deactivated and the execution of the services has been migrated to the new roles.

10) After the updated target subgroup 114A is deployed, the coordinator will pass the information about this new subgroup and cluster to the scheduler 108. 11) The scheduler will then launch any failed jobs during this process on the new cluster. The scheduler will also submit the new jobs that were added after the upgrade process started to the new target cluster. 12) The scheduler selects the next source subgroup and then perform the same steps to upgrade it. 13) This process continues until all the source subgroups are recreated on the new cluster. As such, in this embodiment, an upgrade may be performed without needing two times the original number of nodes. Indeed, the target nodes 113 of the new cluster only need one additional node to perform the upgrade described above.

In another embodiment, an "in-place" upgrade may be performed. A deployment service may be implemented to perform in-place upgrade of services without re-imaging the associated virtual machines. In-place upgrades may be used for upgrading cluster services when applying non-breaking (backward compatible) changes. The in-place upgrade is also used for stateful clusters where it is required to re-use the state (e.g. file system cache data) on the source nodes.

When an in-place upgrade is performed, one of the server roles (e.g. Role 302A or 302B of FIG. 3) is upgraded to the new software version. Then the worker roles are upgraded one by one to the new software version. Afterwards, subsequent server roles may be upgraded. At least in one embodiment, the sequence of steps during the upgrade process are as follows: 1) An upgrade coordinator (which may be a human operator or a software service) is responsible for orchestrating the upgrade process and rolling back to the previous version in case of failures. 2) The upgrade coordinator initiates a deployment service and one or more deployment agents running on each node for upgrading the services.

3) When the upgrade is started, the coordinator copies the new package and configuration files to shared (cloud) storage and informs the deployment service to start the upgrade process. The configuration specifies the new version number and other information required for the upgrade. At least in some embodiments, there is one upgrade configuration section per role. 4) The coordinator designates a server role as ACTIVE. The coordinator will try to pick up the server role in which there are no active resource managers to minimize the number of failovers. The coordinator will then upgrade the first server role to the new version. The deployment agent running on the source nodes will stop any resource manager services, copy the new bits from the cloud storage and restart the resource manager service. After upgrading, the coordinator will set a resource manager on the server role as ACTIVE. 5) The coordinator will then start upgrading the worker roles one at a time. 6) Once all the worker roles are upgraded, the coordinator will finally upgrade any subsequent server roles.

Both "in-place" and "new cluster" upgrades allow changes to be rolled back if something fails during the upgrade process. The two types of upgrades can also be configured to perform slicing, where slicing includes upgrading only one slice (e.g. one worker role) and let it run for some time before proceeding with the next slice. As mentioned previously, the overhead for the new cluster approach is just a single machine for the entire process. As a result, running jobs/services experience minimal disruption. The approach also enables dynamic elasticity, as the cluster can be expanded by adding new worker role(s) or shrunk by draining and deleting existing worker role(s). These concepts will be explained further below with regard to methods 200 of FIG. 2.

Figure 2:
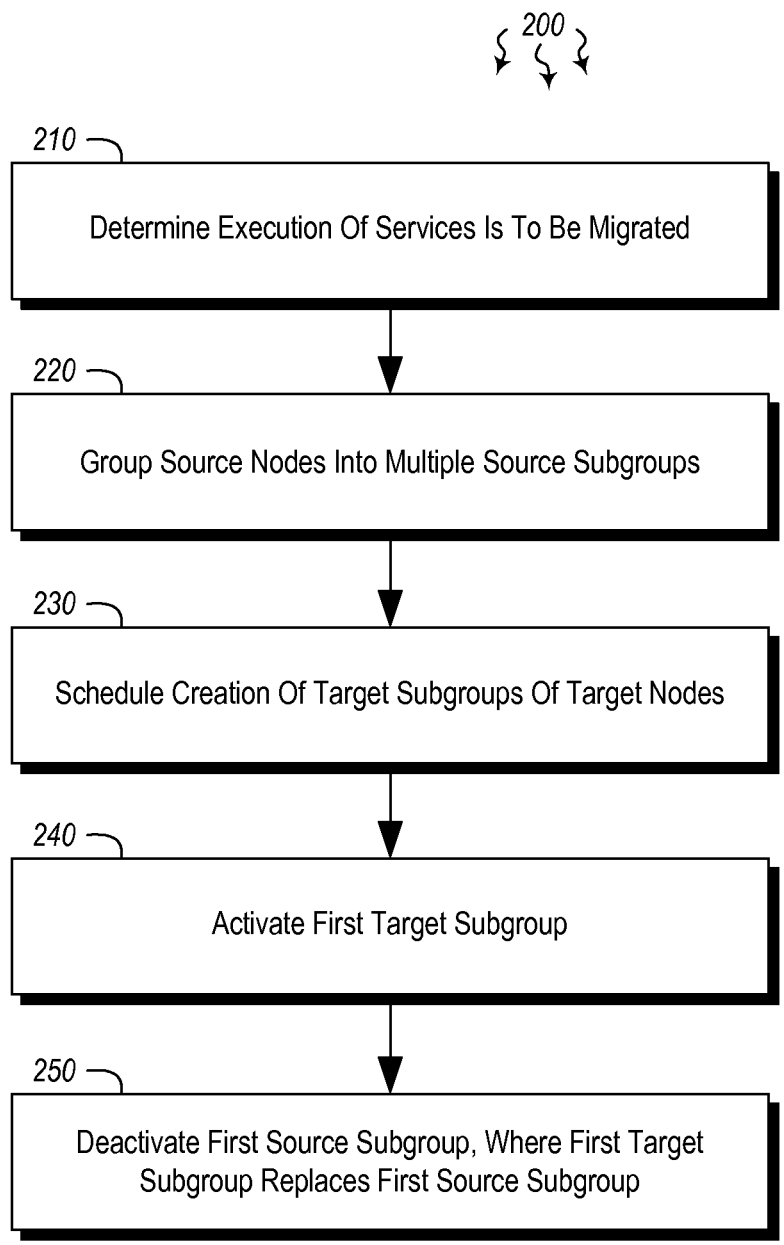
FIG. 2 illustrates a flowchart of an example method for progressively migrating source computer nodes.

In view of the systems and architectures described above, methodologies that may be implemented in accordance with the disclosed subject matter will be better appreciated with reference to the flow chart of FIG. 2. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for progressively migrating source computer nodes. The method 200 will now be described with frequent reference to the components and data of environment 100 of FIG. 1, as well as those of FIG. 3.

Method 200 includes an act of determining that execution of the performed service is to be migrated from the source computer nodes to target computer nodes (act 210). For example, execution monitoring module 106 may determine that execution of service 112A is to be migrated from a node in the source group 110 to a target node 113. Migrating execution of a service may include upgrading the service or other software on the source node (e.g. operating software) from a first software version to a second software version. The first software version is running on the source computer nodes and the second software version is running on the target computer nodes. As mentioned above, once the target node is running with the new version, execution of the service (112A) may be terminated on the source subgroup 111A and transferred to target subgroup 114A. Termination of the service may not occur instantly, and may be delayed in some circumstances, which will be explained further below.

While migrating execution of a service may include an upgrade from a first software version to a second version, that is not always the case. Indeed, in some circumstances, migrating execution of a service or job may occur when migrating services from one node (or set of nodes) to another node (or set of nodes). Thus, even if the target node is running the same software, migration of the execution of the service or job may be moved to that target node at a time determined by the scheduling module 108.

In some cases, during migration, a node that was part of the original or "source" nodes may be released from the source subgroup(s) to which it is assigned, once at least a portion (or all) of the workload running on it has been migrated to a new node such as one of the target nodes 113 in target subgroup 114A. The released "old" source node is capable of being repurposed to be used as a "new" node in the target nodes 113. As such, the new target node (that was previously a source node) can now receive and process migrated workload. Thus, source nodes may be released from their assigned subgroups and may be reassigned to one or more target subgroups of the target nodes 113 to process migrated services. This releasing may occur automatically or at the control of the user 104 (e.g. a system administrator). The automatic release may occur, for example, when execution of a specific service or of multiple services (or all assigned services) has been completed or migrated to a target subgroup.

Method 200 further includes an act of grouping the source computer nodes into multiple source subgroups, each source subgroup includes at least one source computer node (act 220). As shown in FIG. 1, the source computer nodes 110 may be grouped into source subgroups 111A, 111B and 111C. It will be understood that substantially any number of subgroups may be used, and that the three shown in FIG. 1 were chosen arbitrarily. The grouping module 107 may similarly group target nodes 113 into target subgroup (e.g. 114A and 114B). Again, any number of target subgroups may be created. In some cases, the target nodes 113 will include many of the same physical or virtual source nodes. As mentioned previously, a central pool of resources may be used to process jobs, and parts of those resources (cores, processors, etc.) may be logically divided into different clusters or groups. As such, some of the nodes in the target nodes may be source nodes that are classified differently.

Method 200 also includes an act of scheduling creation of target subgroups of target nodes, wherein a target subgroup includes at least one source computer node and corresponds to a source subgroup (act 230). Thus, the scheduling module 108 may schedule the activation (or deactivation) of different source and target nodes. In method 200, the scheduling module 108 activates a first target subgroup corresponding to a first source subgroup (act 240). As such, if source subgroup 111B was processing a service or job (e.g. 112B), and the scheduling module 108 activated target subgroup 114B to take the place of source subgroup 111B, the services and jobs being processed by subgroup 111B would either be terminated or finished and then migrated to target subgroup 114B. In this manner, target subgroup 114B is said to "correspond" to source subgroup 111B. This allows jobs and services processed by one subgroup to remain in a corresponding subgroup. This may be more useful in scenarios where jobs provided by a certain tenant are all processed by the same subgroup or worker role.

Method 200 also includes an act of deactivating the first source subgroup, wherein the first target subgroup replaces the first source subgroup and at least one of the target subgroups is scheduled to be created only after the first source subgroup is deactivated (act 250). The subgroup activating/deactivating module 109 may deactivate source subgroup 111A and activate target subgroup 114A in its place. The target nodes may include various different subgroups or roles, including gateway roles, server roles or other roles. These roles may be standard roles used for networking and various management tasks.

In some embodiments, it may be beneficial to determine which jobs or services are being processed on the subgroup that is to be deactivated before deactivating it. For example, a weighting algorithm may be used to determine when to terminate a job or service or when to let it continue running. In some cases, if the new software version includes a security update, or other high-importance update, the jobs may be terminated promptly so that the upgrade process can begin. On the other hand, if an upgrade is not urgent, and if the running services are deemed important, the upgrade process may be postponed until the jobs or services have completed processing. This weighting algorithm may take various criteria into account, including current processing load on each subgroup and/or each source node, which services or jobs are being processed, who submitted the jobs or services for processing (e.g. applying more deference to certain customers and their submitted jobs), or other factors.

Thus, the weighting algorithm determines a relative importance or "weight" of each service. Higher importance services are less likely to be interrupted mid-process, while lower importance services are more likely to be interrupted mid-process. Similarly, higher importance upgrades are more likely to trigger an immediate upgrade, while lower importance upgrades are less likely to trigger an immediate upgrade. When high importance services are detected on a subgroup, upgrading may be skipped or postponed for that subgroup until execution of those services has completed. Still further, additional source node computing resources may be applied to high importance jobs in order to complete them quicker. Thus, migration of the execution of a service may be hastened for lower importance services to allow source node resources to be transitioned to higher importance services. Likewise, execution of a lower importance service may be terminated to allow source node resources to be transitioned to higher importance services. While each subgroup is being upgraded, one by one, the services or jobs on the other subgroups will continue to be processed by those source subgroups.

In some cases, the computer system 101 may receive input 105 from a user 104 or an indication from another source that one or more new services are to be processed at the computer system (e.g. by source nodes 110). The scheduling module 108 may initiate execution of the new services on the source computer nodes of the activated first target subgroup (e.g. 114A). As such, new jobs may be received during the upgrade process, and may be processed by the target subgroups of the target nodes 113.

In some embodiments, an affinity may exist between services originated by a specified user and the source nodes and source subgroup in which the services are being processed. As such, services originated by the specified user may be assigned to the same source nodes in the same source subgroup. In some situations, one worker role or subgroup will process all jobs from a given user. However, jobs can be distributed over multiple worker roles. When such an affinity exists between jobs, the scheduling module 108 may make additional efforts to ensure that even during the upgrade, jobs or services provided by a user are terminated, migrated, and restarted together. In cases where jobs are distributed over multiple roles or subgroups, the scheduling module may likewise attempt to limit the number of worker roles that execute the job to keep execution confined to a minimal number of roles. Thus, at least in some embodiments, services originated by a specified user may be completed and migrated together from, for example, source subgroup 111A to target subgroup 114A.

When execution of services is migrated from a source subgroup to a target subgroup, there may be instances in which a service is terminated and a user may be disrupted. The execution monitoring module 106 may monitor the execution of the services and determine how the upgrade can be performed while causing the least amount of disruption to users that are using the service (e.g. 112A). Similarly, if multiple users are using a service, the execution monitoring module may determine how the upgrade can be performed to disrupt the fewest users possible. If multiple users are going to be disrupted, additional computing resources may be (temporarily) assigned to a source subgroup to assist in processing the current load and to hasten completion, thereby reducing the number of affected users. Still further, the computer system 101 may determine that another source subgroup is not going to be deactivated for a specified amount of time (for whatever reason) and may migrate a heavily used service or a high importance service to that subgroup for continued processing.

In some cases, services may be terminated immediately upon determining that a high priority update is to be applied. Execution of these services may be migrated from the first source subgroup to the first target subgroup and substantially immediately restarted on the new target subgroup. A determination of when to terminate a job or allow it to finish may thus depend on a variety of factors, each of which may be specified by a user such as an administrator. These factors may be different for different pools of resources, for different user's jobs, for different source or target subgroups, or on different times or days of the week. As such, settings controlling this determination may be parameterized and controlled by the computer system 101 automatically or manually by a user 104. In this manner, computer system subgroups may be upgraded with minimal overhead, minimal disruption to users, and may be performed in stateful and stateless systems, and may include breaking and/or non-breaking updates.

Accordingly, methods, systems and computer program products are provided which progressively migrate source computer nodes to target computer nodes. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for progressively migrating performed services of jobs of different users or tenants from source computer processing devices to target computer processing devices, the computer-implemented method being performed by one or more processors executing computer executable instructions for the computer-implemented method, and the computer-implemented method comprising acts of:

determining that execution of performed services is to be migrated from source computer processing devices to target computer processing devices;

grouping the source computer processing devices of a first cluster into multiple source subgroups with each source subgroup comprising one or more source computer processing devices assigned to each source subgroup, and wherein each source subgroup performs a role relative to processing assigned jobs or services of different users or tenants;

scheduling creation of target subgroups of target computer processing devices of a second cluster, wherein each target subgroup comprises at least one source computer processing device and wherein each target subgroup corresponds to a source subgroup;

progressively migrating the performed services of jobs from the source computer processing devices to the target computer processing devices by deactivating roles one at time while other roles remain running, by performing the following:

activating a first target subgroup of the second cluster by provisioning the first target subgroup with a role corresponding to the role of a first source subgroup of the first cluster;

after the first target subgroup is provisioned with the role corresponding to the first source subgroup but while other roles at other source subgroups of the first cluster are not yet provisioned and continue to run, deactivating the first source subgroup, so that the first target subgroup replaces the first source subgroup; and thereafter (i) activating subsequent target subgroups of the second cluster by provisioning them with the one or more roles corresponding to the respective source subgroup of the first cluster, and then (ii) deactivating each respective source subgroup for each subsequently activated target subgroup, so that each subsequently activated target subgroup replaces one at a time the respective deactivated source subgroup of the first cluster.

2. The computer-implemented method of claim 1, wherein each role is configured to provide execution of specified services.

3. The computer-implemented method of claim 1, wherein progressively migrating the performed services comprises upgrading from a first software version to a second software version, where the first software version is running on the source computer processing devices and the second software version is running on the target computer processing devices.

4. The computer-implemented method of claim 1, wherein progressively migrating the performed services comprises moving execution of a service from a first source computer processing device in a first source subgroup to a first source computer processing device in a target subgroup.

5. The computer-implemented method of claim 1, further comprising acts of:

determining which services are being processed by one or more of the source subgroups; and based on the determination, further determining when the services are to be migrated from the source subgroups to the target subgroups.

6. The computer-implemented method of claim 5, wherein a weighting algorithm is implemented to determine when the services are to be migrated from the source subgroups to the target subgroups, the weighting algorithm determining a relative importance of each service, such that higher importance services are less likely to be interrupted mid-process, while lower importance services are more likely to be interrupted mid-process.

7. The computer-implemented method of claim 6, wherein migration of a service is postponed for one or more higher importance services to allow the higher importance services to complete their execution.

8. The computer-implemented method of claim 6, wherein migration of a service is hastened for one or more lower importance services to allow source computer processing device resources to be transitioned to higher importance services.

9. The computer-implemented method of claim 8, wherein the execution of a lower importance service is terminated to allow source computer processing device resources to be transitioned to higher importance services.

10. A computer program product comprising physical hardware storage media having stored thereon computer-executable instructions that, when executed by one or more processors of a computing system, cause the computing system to perform a method for migrating performed services of jobs of different users or tenants from source computer processing devices to target computer processing devices without having to deactivate all of the source computer processing devices at once, and in a manner that performs the migration progressively so as to reduce the number of cores required to perform the migration, the method performed by the computing system comprises acts of:

determining that execution of performed services is to be migrated from source computer processing devices to target computer processing devices;

grouping the source computer processing devices of a first cluster into multiple source subgroups with each source subgroup comprising one or more source computer processing devices assigned to each source subgroup, and wherein each source subgroup performs a role relative to processing assigned jobs or services of different users or tenants;

scheduling creation of target subgroups of target computer processing devices of a second cluster, wherein each target subgroup comprises at least one source computer processing device and wherein each target subgroup corresponds to a source subgroup;

progressively migrating the performed services of jobs from the source computer processing devices to the target computer processing devices by deactivating roles one at a time while other roles remain running, by performing the following:

activating a first target subgroup of the second cluster by provisioning the first target subgroup with a role corresponding to the role of a first source subgroup of the first cluster;

after the first target subgroup is provisioned with the role corresponding to the first source subgroup but while other roles at other source subgroups of the first cluster are not yet provisioned and continue to run, deactivating the first source subgroup, so that the first target subgroup replaces the first source subgroup; and thereafter (i) activating subsequent target subgroups of the second cluster by provisioning them with the one or more roles corresponding to the respective source subgroup of the first cluster, and then (ii) deactivating each respective source subgroup for each subsequently activated target subgroup, so that each subsequently activated target subgroup replaces one at a time the respective deactivated source subgroup of the first cluster.

11. The computer program product of claim 10, wherein one or more source computer processing devices that have been deactivated are repurposed and used as target computer processing devices.

12. The computer program product of claim 10, wherein the method performed by the computing system further comprises acts of:

receiving an indication that one or more new services are to be processed at the first source subgroup; and initiating execution of the new services on the source computer processing device of the activated first target subgroup.

13. The computer program product of claim 10, wherein an affinity exists between services originated by a specified user and the source computer processing devices and source subgroup in which the originated services are being processed, such that services originated by the specified user are assigned to the same source computer processing devices in the same source subgroup.

14. The computer program product of claim 13, wherein services originated by the specified user are completed and migrated together from the first source subgroup to the first target subgroup.

15. The computer program product of claim 14, wherein computing resources from one or more source computer processing devices are assigned to complete services originated by the specified user running on the at least one source computer processing device in the first source subgroup to hasten processing of those services.

16. The computer program product of claim 13, wherein the method performed by the computing system further comprises acts of:

determining that a second source subgroup is not going to be deactivated for a specified amount of time; and determining that one or more services originated by the specified user are to be migrated to the second source subgroup to avoid disruption of services originated by the specified user.

17. A computer system comprising the following:

one or more processors;

memory having stored thereon computer-executable instructions that, when executed by the one or more processors, cause the one or more processors to instantiate a computing architecture that performs migration of performed services of jobs of different users or tenants from source computer processing devices to target computer processing devices without having to deactivate all of the source computer processing devices at once, and in a manner that performs the migration progressively so as to reduce the number of cores required to perform the migration, and wherein the architecture comprises:

an execution monitoring module that determines that execution of performed services is to be migrated from source computer processing devices to target computer processing devices;

a grouping module that:

groups the source computer processing devices of a first cluster into multiple source subgroups with each source subgroup comprising one or more source computer processing devices assigned to each source subgroup, and wherein each source subgroup performs a role relative to processing assigned jobs or services of different users or tenants; and that creates target subgroups of target computer processing devices of a second cluster, wherein each target subgroup comprises at least one source computer processing device and wherein each target subgroup corresponds to a source subgroup;

a scheduling module that schedules migration of performed services from the source computer processing devices to the target computer processing devices; and a subgroup activating and deactivating module that progressively migrates the performed services of jobs from the source computer processing devices to the target computer processing devices by deactivating roles one at time while other roles remain running, by performing the following:

activating a first target subgroup of the second cluster by provisioning the first target subgroup with a role corresponding to the role of a first source subgroup of the first cluster; and thereafter (i) activating subsequent target subgroups of the second cluster by provisioning them with the one or more roles corresponding to the respective source subgroup of the first cluster, and then (ii) deactivating each respective source subgroup for each subsequently activated target subgroup, so that each subsequently activated target subgroup replaces one at a time the respective deactivated source subgroup of the first cluster.

18. The computer system of claim 17, wherein one or more services are terminated immediately upon determining that a high priority update is to be applied when execution of the service is migrated from the first source subgroup to the first target subgroup.

19. The computer system of claim 17, wherein execution of the performed service is migrated in at least one of stateful systems and stateless systems, and wherein updates applied during the migration comprise at least one of breaking updates and non-breaking updates.

20. The computer system of claim 17, wherein at least one source computer processing device is released from the first source subgroup once execution of the performed service has been migrated to the first target subgroup, the at least one source computer processing device being reassigned to at least one target subgroup to process migrated services.

21. The computer-implemented method of claim 1, wherein one or more source computer processing devices that have been deactivated are repurposed and used as target computer processing devices.

* * * * *